United States Patent
Matsuura et al.

(10) Patent No.: US 7,175,698 B2
(45) Date of Patent: Feb. 13, 2007

(54) CANISTER

(75) Inventors: Kazuya Matsuura, Hamakita (JP);
Takashi Sakagami, Hamakita (JP);
Kazuhiro Yamaguchi, Hamakita (JP)

(73) Assignee: Toyo Roki Seizo Kabushiki Kaisha, Shizuoka-ken (JP)

( * ) Notice: Subject to any disclaimer, the term of this patent is extended or adjusted under 35 U.S.C. 154(b) by 268 days.

(21) Appl. No.: 10/877,988

(22) Filed: Jun. 29, 2004

(65) Prior Publication Data

US 2005/0039603 A1 Feb. 24, 2005

(30) Foreign Application Priority Data

Jun. 30, 2003 (JP) ............... 2003-187986

(51) Int. Cl.
*B01D 53/02* (2006.01)
*F02M 25/08* (2006.01)

(52) U.S. Cl. .......................... 96/134; 96/139
(58) Field of Classification Search .............. 96/134, 96/135, 131, 139, 147, 152; 123/518–521
See application file for complete search history.

(56) References Cited

U.S. PATENT DOCUMENTS

| | | | | |
|---|---|---|---|---|
| 4,306,894 A | * | 12/1981 | Fukami et al. | 96/131 |
| 5,207,808 A | * | 5/1993 | Haruta et al. | 96/131 |
| 5,632,251 A | * | 5/1997 | Ishikawa | 123/519 |
| 5,645,036 A | * | 7/1997 | Matsumoto et al. | 123/519 |
| 5,851,268 A | * | 12/1998 | Hyodo et al. | 96/131 |
| 2001/0015134 A1 * | | 8/2001 | Uchino et al. | 96/130 |
| 2001/0039881 A1 * | | 11/2001 | Moriyama et al. | 96/139 |
| 2002/0026874 A1 * | | 3/2002 | Ikuma et al. | 96/144 |
| 2003/0024397 A1 * | | 2/2003 | Meiller et al. | 96/139 |
| 2004/0007135 A1 * | | 1/2004 | Ikuma et al. | 96/135 |

FOREIGN PATENT DOCUMENTS

| | | |
|---|---|---|
| JP | 57-190631 | 11/1982 |
| JP | 63-115568 | 7/1988 |
| JP | 4-44840 | 10/1992 |
| JP | 07-139441 | 5/1995 |
| JP | 08-319906 | 3/1996 |
| JP | 2002-048016 | 2/2002 |

* cited by examiner

*Primary Examiner*—Frank M. Lawrence
(74) *Attorney, Agent, or Firm*—Young & Thompson

(57) ABSTRACT

In a canister, an activated charcoal layer is placed in a fluid passage by which an air intake port is connected to a charge port or purge port, and a chamber dividing the charcoal layer into sections so as to traverse the fuel passage is defined by a grid and a filter pad placed on the surface of the grid. The grid has apertures uniformly formed on the surface of the grid contacting with the filter pad, so as to communicate with the chamber. Formation of the apertures on the surface of the grid prevents the filter pad from coming into the mesh of the grid, thus maintaining flatness of the filter pad.

8 Claims, 5 Drawing Sheets

CANISTER

DETAILED DESCRIPTION OF THE INVENTION

Technical Field to Which the Invention Belongs

The present invention relates to a canister in which a chamber is provided in an activated charcoal layer.

Conventional Technology

A canister is provided in a fuel supply system between a fuel tank and an engine of a vehicle, in order to prevent the fuel from being released into the air. As shown in FIG. 1, the canister includes an activated charcoal layer 4, which is provided in a fuel passage by which an air intake port 1 is connected to a charge port 2 or purge port 3, to perform adsorption of the fuel and dissipation. A chamber space 5 is proved in the above-mentioned activated charcoal layer 4 so as to traverse the fuel passage. The chamber 5 has a grid 5a and a filter pad 5b, which is placed on the surface of the grid 5a.

A vaporized fuel generated in the fuel tank in a non-operating state of the engine enters the activated charcoal layer 4 from the charge port 2 to be adsorbed by the activated charcoal. When the engine operates, negative pressure in an air intake system causes air to enter the activated charcoal layer 4 from the air intake port 1 to dissipate the fuel from the activated charcoal, with the result that the air accompanied with the fuel goes from the purge port 3 toward the engine. The above-mentioned chamber 5, which divides the activated charcoal layer 4 into two layers 4a, 4b, so as to provide an effect that the fuel is temporarily received in the chamber 5 to be mixed with air existing in the chamber 5, and there is permitted a flow from one of the activated charcoal layers 4a, 4b to the other thereof. This enhances adsorption efficiency and dissipation efficiency of the fuel (see, for example, the following patent document Nos. 1, 2, 3, 4, 5 and 6).

Patent Document No. 1: Japanese Patent Publication No. S63-32980.
Patent Document No. 2: Japanese Utility Model Publication No. S63-115568.
Patent Document No. 3: Japanese Utility Model Publication No. H4-44840.
Patent Document No. 4: Japanese Patent No. 3265094.
Patent Document No. 5: Japanese Laid-Open Patent Application No. H8-319906.
Patent Document No. 6: Japanese Laid-Open Patent Application No. 2002-48016.

The above-mentioned Patent Document No. 4 (Japanese Patent No. 3265094) corresponds to U.S. Pat. No. 5,538,542, which is incorporated herein by reference.

Subject to be Solved by the Invention

However, according to the conventional canister, the grid 5a is formed into a large-meshed lattice structure as shown in FIG. 2(A), with the result that the filter pad 5b, which is placed on the surface of the grid 5a, warps into the mesh of the grid 5a, as shown in FIG. 2(B), thus decreasing a volume of the chamber 5. Decrease in volume of the chamber 5 permits the fuel from the fuel tank to pass easily through the activated charcoal layer 4, i.e., the first layer 4a and the second layer 4b so as to be released into the air. When the fuel is dissipated from the activated charcoal, it is also become difficult for the fuel to be dissipated from the whole surface of the activated charcoal layer An object of the present invention is to provide a canister, which permits to solve the above-mentioned problems.

Means to Solve the Subject

In order to attain the aforementioned object, the present invention adopts a canister in which an activated charcoal layer is placed in a fluid passage by which an air intake port is connected to a charge port or purge port, and a chamber that divides the activated charcoal layer into sections so as to traverse the fuel passage is defined by a grid and a filter pad placed on a surface of the grid, wherein: the grid has a plurality of apertures uniformly formed on a surface of the grid, which comes into contact with the filter pad, the apertures communicating with said chamber.

According to the invention, formation of the plurality of apertures on the surface of the grid prevents the filter pad, which is placed on the surface of the grid, from coming into the mesh of the grid, thus maintaining flatness of the filter pad. The original volume of the chamber can therefore be maintained, so as to enable the fuel from the fuel tank to be absorbed effectively by the first and second layers of the activated charcoal layer, thus preventing the fuel from being released into the air. When the fuel is dissipated from the activated charcoal, the fuel can easily be dissipated from the whole surface of the activated charcoal layer.

The present invention adopts the canister, wherein: the grid comprises two flat plates with the plurality of apertures, the plates facing each other so that the chamber is placed between the plates.

According to the invention, the chamber is defined by the two flat plates with the plurality of apertures, thus making it possible to provide easily the chamber in the activated charcoal layer.

The present invention adopts the canister, wherein: the two flat plates are combined to each other through a displacement prevention device.

According to the invention, displacement of the two flat plates due to vibration of a vehicle can be avoided, thus preventing the activated charcoal from coming into the chamber.

The present invention adopts the canister, wherein: the apertures formed on one surface of the grid have paths that communicate, in a deviating state in a central portion of the grid, with paths of the apertures formed on another surface thereof.

According to the invention, the paths of the apertures formed on one surface of the grid communicate, in the deviating state in the central portion of the grid, with the paths of the apertures formed on the other surface of the grid, so as to provide winding paths in the chamber, thus permitting an effective absorption of the fuel by the activated charcoal and prevention of dissipation thereof into the air.

According to the present invention in the canister in which the activated charcoal layer is placed in the fluid passage by which the air intake port is connected to the charge port or purge port, and the chamber that divides the activated charcoal layer into the sections so as to traverse the fuel passage is defined by the grid and the filter pad placed on the surface of the grid, the grid has the plurality of apertures uniformly formed on the surface of the grid, which comes into contact with the filter pad, the apertures communicating with the chamber. It is therefore possible to prevent the filter pad, which is placed on the surface of the grid, from coming into the mesh of the grid, thus maintaining flatness of the filter pad. The original volume of the chamber can therefore be maintained, so as to enable the fuel from the fuel tank to be absorbed effectively by the first and second layers of the activated charcoal layer, thus preventing the fuel from being released into the air. When the fuel is dissipated from the activated charcoal, the fuel can easily be dissipated from the whole surface of the activated charcoal layer.

According to the present invention claimed in claim 2, in the canister claimed in claim 1, the grid comprises two flat plates with the plurality of apertures, the plates facing each other so that the chamber is placed between the plates, thus making it possible to provide easily the chamber in the activated charcoal layer. When the two flat plates have the same shape, use of a single mold suffices for manufacture of the plates, permitting a substantial reduction in costs.

According to the present invention, in the canister, the two flat plates are combined to each other through the displacement prevention device, with the result that displacement of the two flat plates due to vibration of a vehicle can be avoided, thus preventing the activated charcoal from coming into the chamber.

According to the present invention, in the canister, the paths of the apertures formed on one surface of the grid communicate, in the deviating state in the central portion of the grid, with the paths of the apertures formed on the other surface of the grid, so as to provide winding paths in the chamber, thus permitting an effective absorption of the fuel by the activated charcoal and prevention of dissipation thereof into the air.

BRIEF DESCRIPTION OF THE DRAWINGS

FIG. 5(A) is a plan view of the grid, FIG. 5(B) is a bottom view thereof and FIG. 5(C) is a cross-sectional view cut along the line C—C in FIG. 5(A).

EMBODIMENTS OF THE INVENTION

Now, the embodiments of the present invention will be described below with reference to the drawings.

First Embodiment

Figure 3:
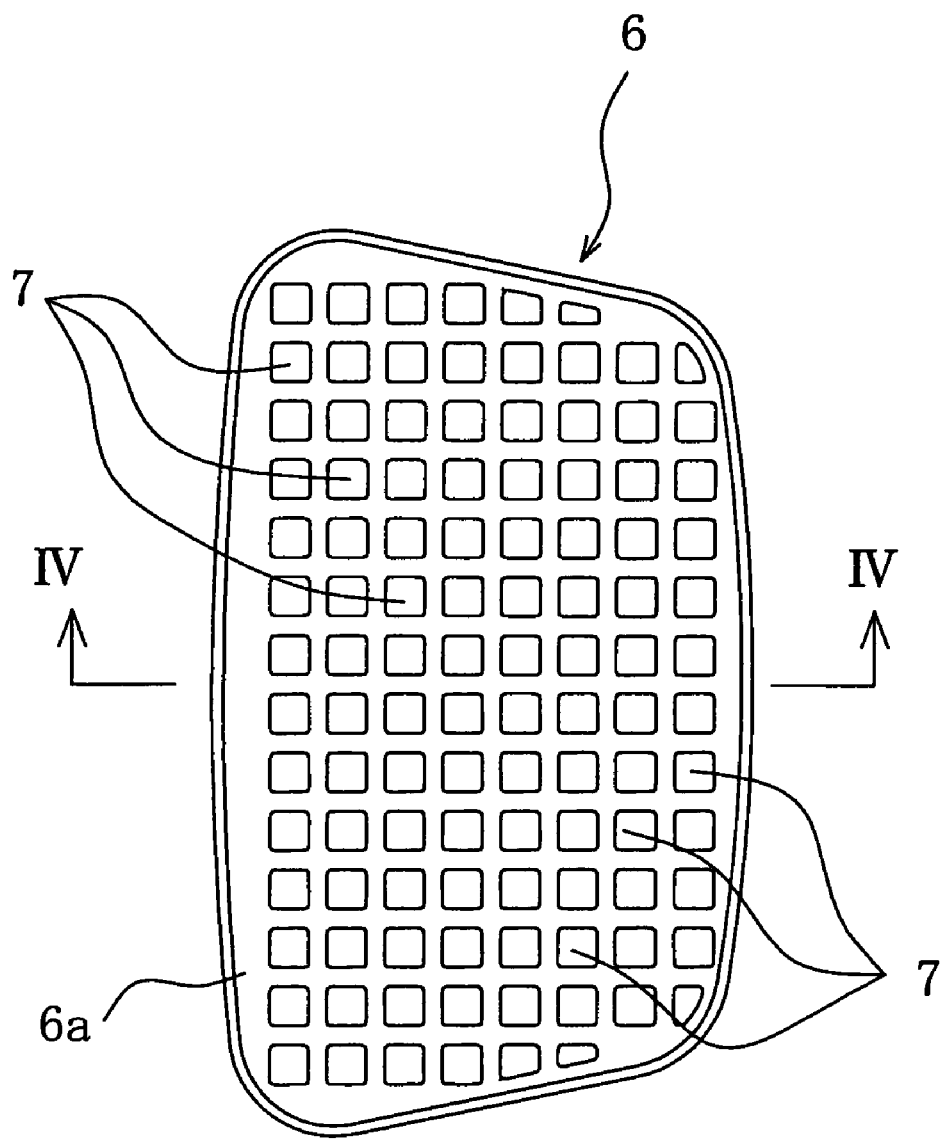
FIG. 3 is a plan view of a grid used in the canister according to the first embodiment of the present invention.

As shown in FIGS. 3 and 4, a plurality of apertures 7 communicating with a chamber 5 is formed uniformly on the surface of a grid 6 of a canister, which comes into contact with a filter pad 5*b*. Each opening of the apertures 7 has a square shape so as to provide the maximum total opening area of the surface of the grid 6. The shape of the aperture is not limited only to the square, but may be the other polygon or a circle.

The grid 6 is composed of two flat plates 6*a*, 6*b* each having the above-mentioned plurality of apertures. These plates face each other so that the chamber 5 is between these plates. Each of the flat plates has a flat plate portion 8 and a peripheral wall portion 9 surrounding the periphery of the flat plate portion 8. The two flat plates are assembled into the grid by bringing end surfaces of the peripheral wall portions 9 into contact with each other. The flat plate portion 8 and the peripheral wall portion 9 may be formed separately from each other and then combined together. Alternatively, the flat plate portions 8 may be connected by means of a single peripheral wall portion 9.

Figure 4A:
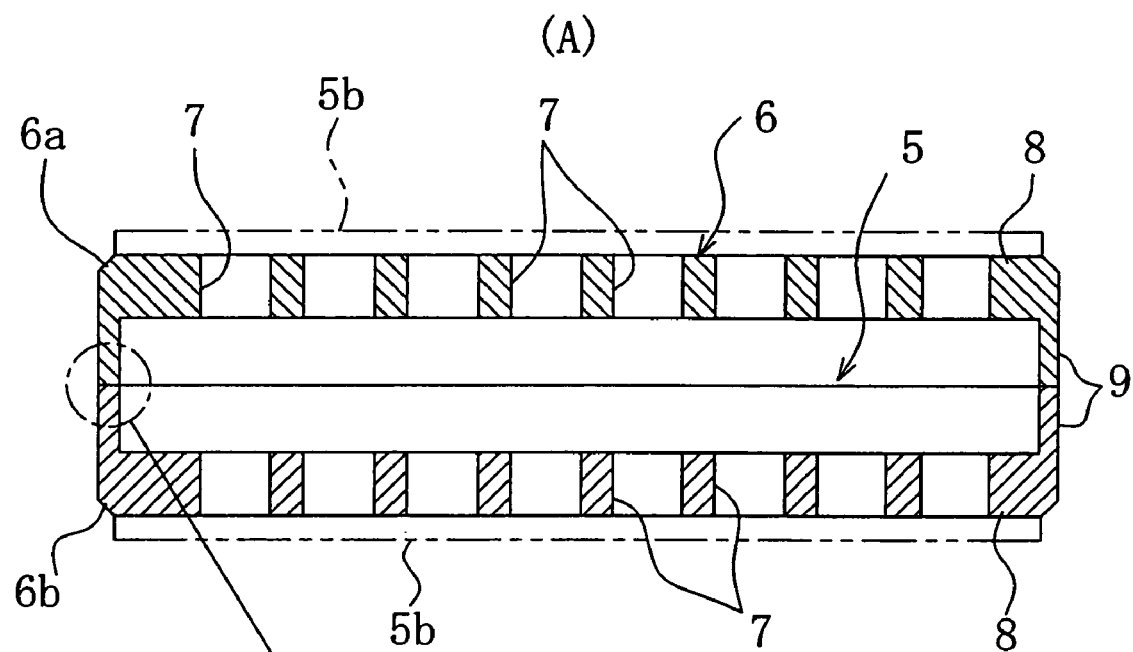
FIG. 4(A) is a cross-sectional view cut along the line IV—IV in FIG. 3.
Figure 4B:
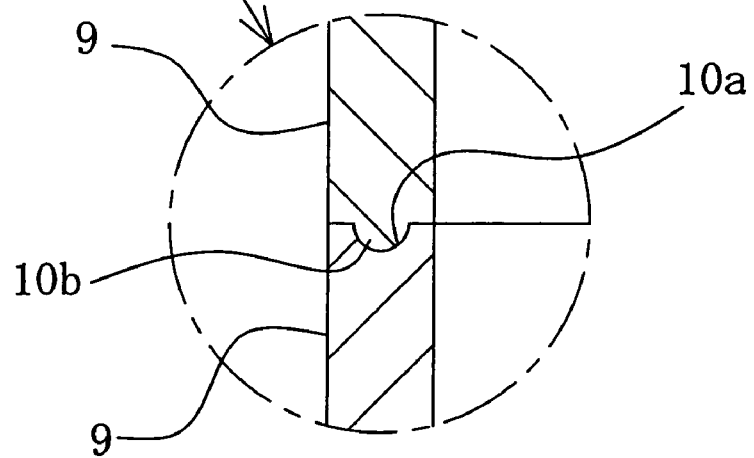
FIG. 4(B) is an enlarged view of a portion in FIG. 4(A).

As shown in FIG. 4(B), the two flat plates 6*a*, 6*b* are combined to each other through a displacement prevention device. More specifically, the displacement prevention device is composed of a recess 10*a* and a projection 10*b* formed on the end surfaces of the peripheral wall portions 9. Engagement of the projection 10*b* into the recess 10*a* avoids displacement of the two flat plates 6*a*, 6*b* due to vibration of a vehicle, thus preventing the activated charcoal from coming into the chamber.

Figure 1:
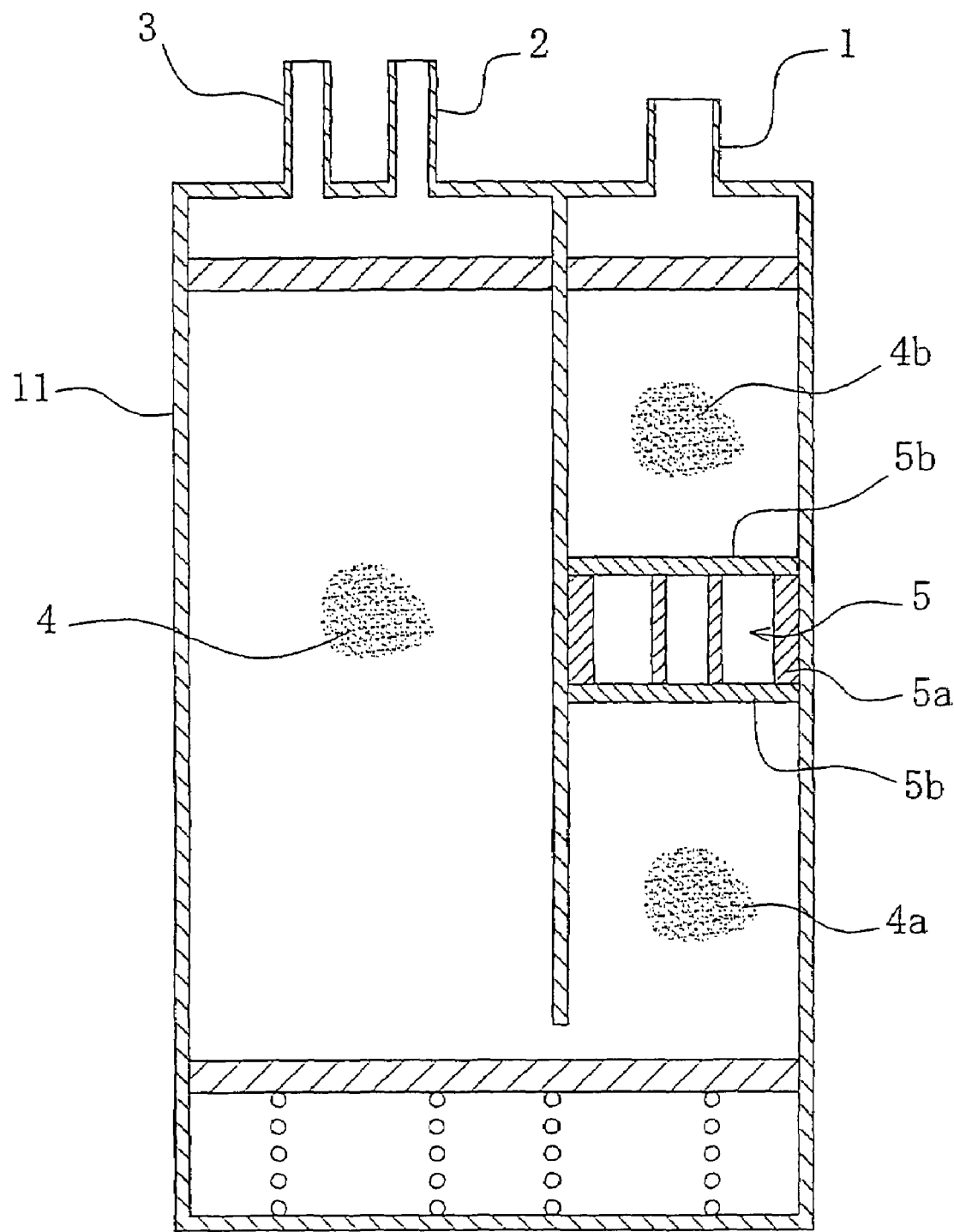
FIG. 1 is a longitudinal cross-sectional view illustrating the conventional canister.
Figure 2A:
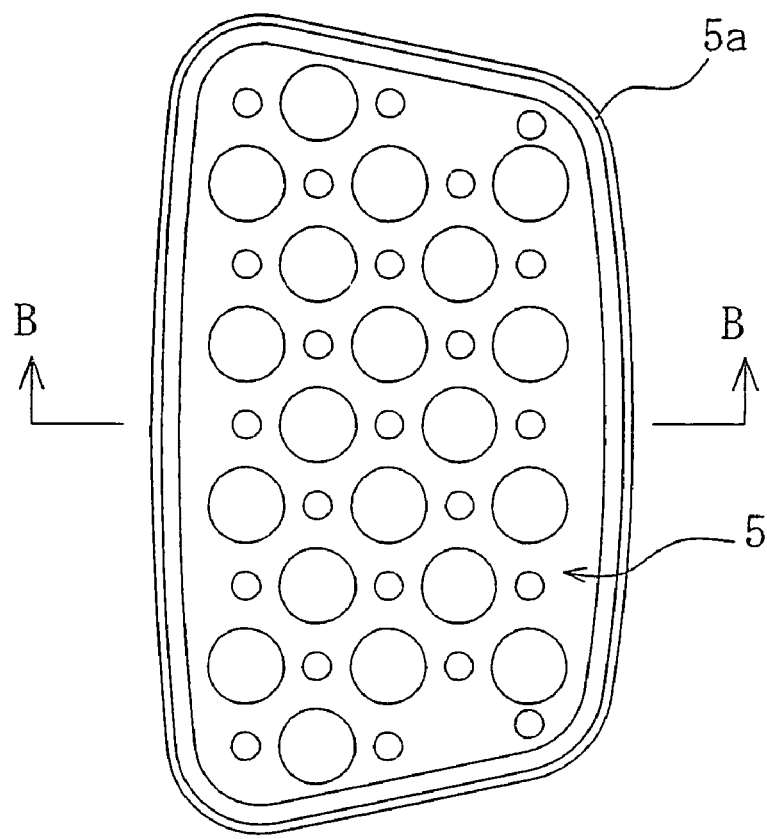
FIG. 2(A) is a plan view of a grid provided in the conventional canister.
Figure 2B:
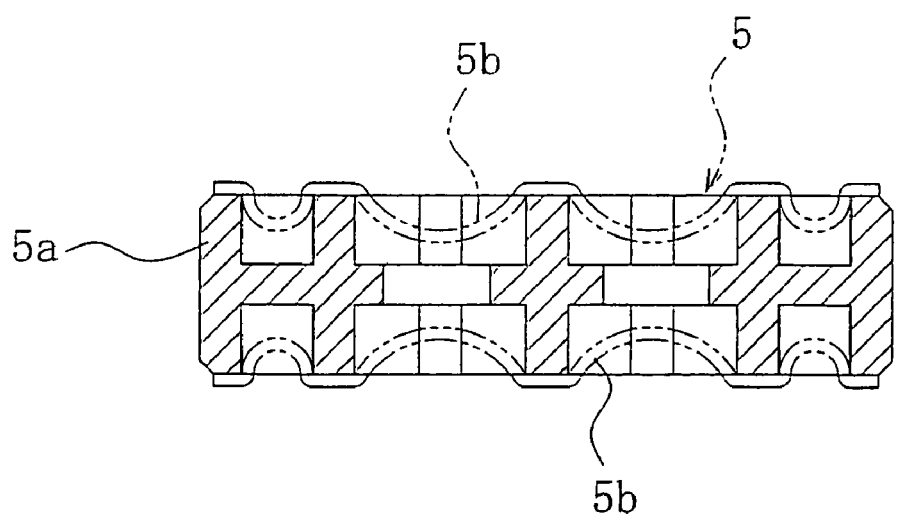
FIG. 2(B) is a cross-sectional view cut along the line B—B in FIG. 2(A).

The above-described grid 6 is received, in place of the grid 5*a* as shown in FIG. 1, in a casing 11 for the canister. More specifically, the activated charcoal layer 4 is placed in a passage for fluid of fuel and air, which extends from the air intake port 1 to the charge port 2 and the purge port 3, and the grid 6 is placed so as to divide the activated charcoal layer 4 into sections and traverse the above-mentioned passage. Filter pads 5*b* are placed on the upper and lower surfaces of the grid 6. The filter pads 5*b* prevent the activated charcoal from coming into the chamber 5. As shown in FIG. 4(A), the grid 6 has on the surfaces thereof the plurality of apertures 7, with the result that the filter pad 5*b*, which is placed on the surface of the grid 6, does not come into the mesh of the grid 6, thus maintaining flatness of the filter pad 5*b*. The original volume of the chamber 5 can therefore be maintained, without occurrence of decrease in volume, so as to enable the fuel from the fuel tank to be absorbed effectively by the first and second layers 4*a*, 4*b* of the activated charcoal layer 4, thus preventing the fuel from being released into the air. When the fuel is dissipated from the activated charcoal, the fuel can easily be dissipated from the whole surface of the activated charcoal layer.

Now, description will be given below of operation of the canister having the above-described structure, with reference to FIGS. 1, 3 and 4.

A vaporized fuel generated in the fuel tank in a non-operating state of an engine enters the activated charcoal layer 4 from the charge port 2 to be adsorbed by the activated charcoal. The flatness of the filter pad 5*b* is maintained on the grid 6 and the original volume of the chamber 5 is maintained, without occurrence of decrease in volume, so as to enable the fuel from the fuel tank to be absorbed effectively by the first and second layers 4*a*, 4*b* of the activated charcoal layer 4, thus preventing the fuel from being released through the air intake port 1 into the air.

When the engine operates, negative pressure in an air intake system causes air to enter the activated charcoal layer 4 from the air intake port 1 to dissipate the fuel from the activated charcoal, with the result that the air accompanied with the fuel goes from the purge port 3 toward the engine. The original volume of the chamber 5 is maintained, without occurrence of decrease in volume, as mentioned above. The air flowed from the air intake port 1 into the second layer 4*b* enters the chamber 5 to be mixed properly with the fuel, while dissipating the fuel from the activated charcoal in the second layer 4*b*. Then, the air enters the first layer 4*a* and then goes toward the engine, while dissipating the fuel from the activated charcoal in the first layer 4*a*. The chamber 5 facilitates removal of the fuel from the whole surface of the activated charcoal layer in this manner.

Second Embodiment

Figure 5A:
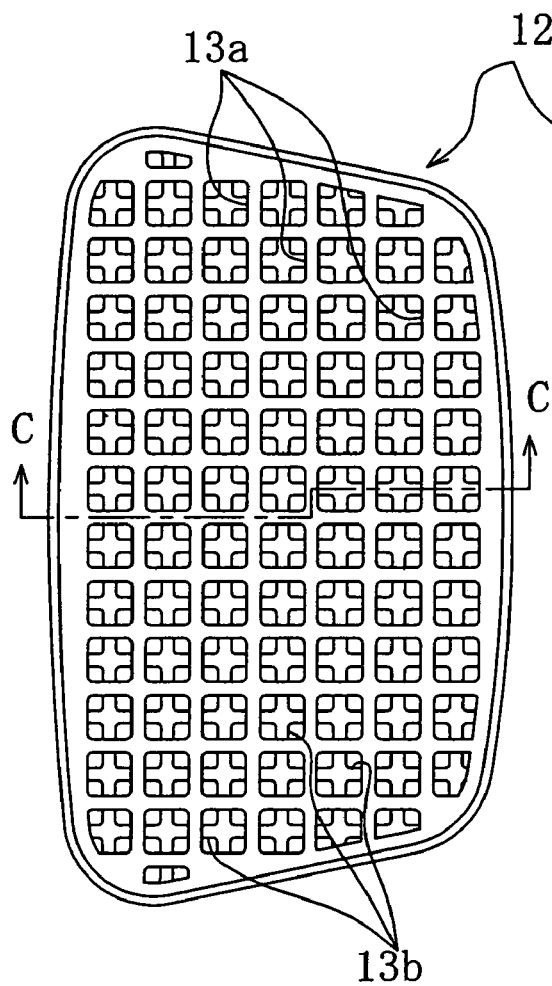
FIGS. 5(A), 5(B) and 5(C) illustrate the grid used in the canister according to the second embodiment of the present invention.
Figure 5B:
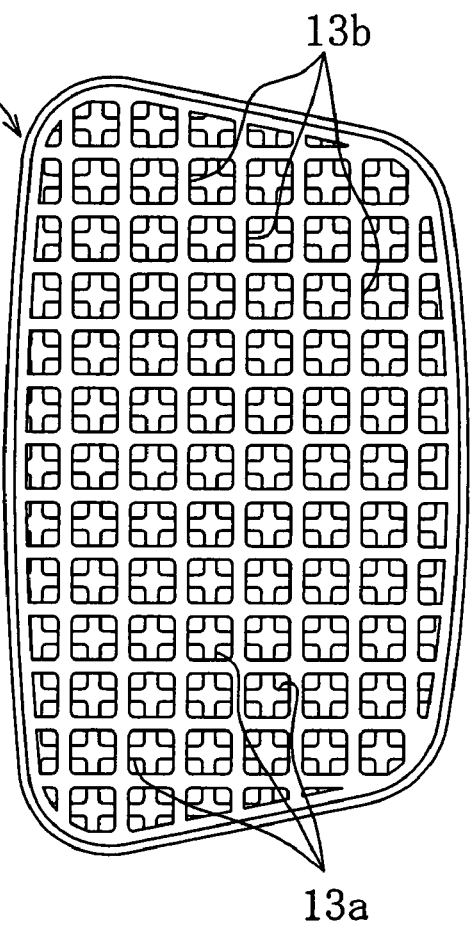
Figure 5C:
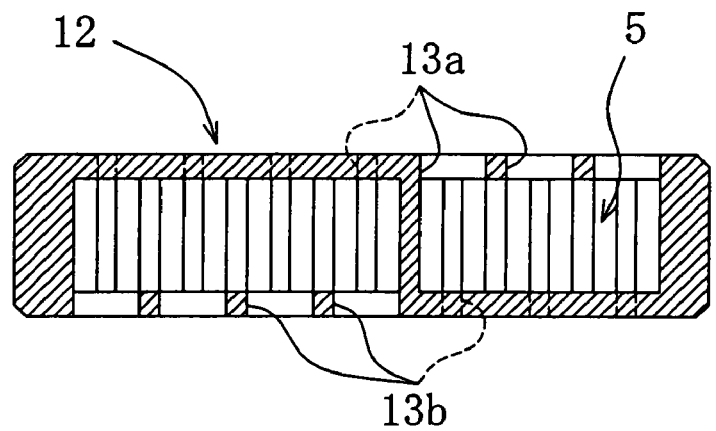

As shown in FIG. 5, the grid 12 of the canister according to the second embodiment of the present invention is composed, in a different manner from the first embodiment, of a single plate body so that paths of the apertures 13a formed on one surface of the grid 12 communicate, in the deviating state in the central portion of the grid 12, with paths of the apertures 13b formed on the other surface of the grid 12, so as to provide winding paths in the chamber. More specifically, the apertures 13a of the one surface are shifted from the apertures 13b by a half pitch in the "X" and "Y" directions and the paths of the apertures 13a and the paths of the apertures 13b extend into the inside of the grid 12 so as to be communicated with each other. The first embodiment of the present invention may be modified so that the apertures 7 of the flat plate 6a and the aperture 7 of the flat plate 6b are shifted to each other, without facing directly each other. According to the second embodiment of the present invention, the single mold for preparation suffices in comparison with the first embodiment of the present invention. There is no need to assemble the two plates as prepared, thus providing an advantageous effect.

The above-described grid 12 is received, in place of the grid 5a as shown in FIG. 1, in a casing 11 for the canister. Filter pads 5b are placed on the upper and lower surfaces of the grid 12.

According to the grid 12, the paths of the apertures 13a formed on one surface of the grid 12 communicate, in the deviating state in the central portion of the grid 12, with the paths of the apertures 13b formed on the other surface of the grid 12, so as to provide winding paths in the chamber, thus enabling the fuel to be absorbed effectively by the activated charcoal layer and preventing the fuel from being released into the air.

The present invention is not limited only to the structure as shown in FIG. 1. There may be adopted the other structure, for example a structure that an air intake port is provided at one end of a tubular casing and a charge port and a purge port are provided at the other end thereof.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2003-187986 filed on Jun. 30, 2003 including the specification, claims, drawings and summary is incorporated herein by reference in its entirety.

What is claimed is:

1. A canister in which an activated charcoal layer is placed in a fluid passage by which an air intake port is connected to a charge port or purge port, and a chamber that divides the activated charcoal layer into sections so as to traverse the fuel passage is defined by a grid and a filter pad placed on a surface of the grid, wherein: the grid has a plurality of apertures uniformly formed on a surface of the grid, which comes into contact with the filter pad, the apertures communicating with said chamber, the grid comprising a single flat plate having first and second opposite surfaces, the first surface having first openings formed thereon and the second surface having second openings formed thereon so as to correspond to the first openings, respectively, the first openings deviating from the corresponding second openings in a direction along respective planes of the first and second surfaces, the first openings communicating with the corresponding second openings through paths, respectively.

2. A canister, comprising:
a fluid passage;
an activated charcoal layer provided in the fluid passage;
a chamber dividing the activated charcoal layer into sections so as to traverse a fuel passage, the chamber including a grid and plural filter pads placed on a surface of the grid; and
a plurality of apertures uniformly formed on a surface of the grid, which comes into contact with the filter pad, the apertures communicating with said chamber, wherein,
the grid comprises a single flat plate having first and second opposite surfaces, the first surface having first aperture openings formed thereon and the second surface having second aperture openings formed thereon so as to correspond to the first openings, respectively, the first openings deviating from the corresponding second openings in a direction along respective planes of the first and second surfaces, the first openings communicating with the corresponding second openings through paths, respectively.

3. The canister of claim 2, further comprising:
a charge port;
a purge port; and
an air intake port connected, via the fluid passage and charcoal layer to one of the charge port and the purge port.

4. The canister of claim 2, wherein,
the filter pads are placed on upper and lower surfaces of the grid.

5. The canister of claim 4, wherein,
the paths of the first openings communicate, in a deviating state in a central portion of the grid, with the paths of the second openings to provide winding paths in the chamber.

6. A canister, comprising:
a charge port;
a purge port;
a fluid passage;
an activated charcoal layer provided in the fluid passage;
an air intake port connected, via the fluid passage and charcoal layer to one of the charge port and the purge port;
a chamber dividing the activated charcoal layer into sections traverse to the fuel passage, the chamber including a single plate grid;
filter pads placed on a surface of the grid; and
a plurality of first and second apertures uniformly formed on a surface of the grid in contact with the filter pad, the apertures communicating with said chamber, wherein,
the grid is of a single plate body so that paths of the first apertures formed on a first surface of the grid communicate, in a deviating state in a central portion of the grid, with paths of the second apertures formed on a second surface of the grid, providing winding paths in the chamber,
the first apertures of the first surface being shifted from the second apertures by a half pitch in the horizontal ("X") and vertical ("Y") directions and the paths of the first apertures and the paths of the second apertures extend into an inside of the grid to be communicated with each other.

7. The canister of claim 6, wherein,
the filter pads are placed on upper and lower surfaces of the grid.

8. The canister of claim 7, wherein,
the paths of the first apertures communicate, in a deviating state in a central portion of the grid, with the paths of the second apertures to provide the winding paths in the chamber.

* * * * *